United States Patent [19]

Celms

[11] 4,118,044
[45] Oct. 3, 1978

[54] GATE MECHANISM FOR CART

[75] Inventor: Harry Celms, Battle Creek, Mich.

[73] Assignee: Roblin Industries, Inc., Battle Creek, Mich.

[21] Appl. No.: 787,886

[22] Filed: Apr. 15, 1977

[51] Int. Cl.² .............................................. B62B 11/00
[52] U.S. Cl. ........................... 280/33.99 F; 186/1 AC
[58] Field of Search ................. 280/33.99 R, 33.99 A, 280/33.99 F, 33.99 H, 33.99 S, 33.99 T, DIG. 4; 186/1 AC

[56] References Cited

U.S. PATENT DOCUMENTS

| | | | |
|---|---|---|---|
| 3,245,498 | 4/1966 | Stanley et al. | 280/33.99 F X |
| 3,503,622 | 3/1970 | Romero | 280/33.99 F |
| 3,815,932 | 6/1974 | Ruger | 280/33.99 F |

*Primary Examiner*—Robert R. Song
*Assistant Examiner*—Gene A. Church
*Attorney, Agent, or Firm*—Blanchard, Flynn, Thiel, Boutell & Tanis

[57] ABSTRACT

A gate construction for a shopping cart basket wherein a gate panel is disposed between sidewalls of the basket for closing an end thereof. The gate panel has its lower edge pivotally supported on a pair of brackets mounted to the sidewalls adjacent the lower corners thereof. A latch structure coacts between the sidewalls and the upper corners of the gate for holding the gate in a closed position. The pivotal mounting of the gate on the brackets permits the gate panel to be lifted upwardly to release the latch structure. The gate panel can then be swung outwardly and downwardly away from the basket into an intermediate open position. The support brackets are provided with substantially L-shaped slots in which the lower edge of the gate panel is pivotally and slidably supported, which slots have elongated horizontal portions disposed below and extending rearwardly along the bottom wall of the basket. When the gate is swung into the intermediate open position, the gate can then be pushed rearwardly so that it is slidably retracted beneath the bottom wall of the basket.

19 Claims, 6 Drawing Figures

GATE MECHANISM FOR CART

FIELD OF THE INVENTION

This invention relates to a gate construction for a shopping cart basket and, more particularly, to a gate construction including a gate panel pivotable about an axis near its lower edge for opening an end of the basket and slidable into a storage position beneath the bottom wall of the basket.

BACKGROUND OF THE INVENTION

The gate construction embodying the present invention is an improvement on shopping cart basket gate constructions disclosed in U.S. Pat. Nos. 3,503,622 (Romero), 3,245,498 (Stanley et al), and 3,815,932 (Ruger). The aforementioned patents disclose carts used by customers to transport articles in a supermarket to a checkout counter, more particularly of the type wherein the upper or primary goods basket includes a fixed rearward portion and a pivoted forward portion. The pivoted forward portion has a bottom wall, sidewalls and a forward end wall and is pivoted on a substantially horizontal, transverse axis along the rear edge of the bottom wall. Thus, the forward portion of the basket when in a goods receiving or use position extends forwardly from the rear basket portion and with its bottom wall substantially horizontal. On the other hand, the forward basket portion can be pivoted upwardly about its pivot axis to a storage or nesting position wherein the bottom wall thereof is substantially upstanding. The end wall of the forward basket portion is defined by a gate panel pivotable generally along its bottom edge and which in an opened position is adapted to lie for example atop a checkout counter to form a bridge or a continuation of the basket bottom wall to facilitate transfer of goods from the cart basket with little or no lifting.

In each of the above-mentioned patents, the gate panel must be manually manipulated by either the customer or the checkout clerk to effect opening of the gate, which manipulations normally involve an upward lifting of the gate followed by a forward swinging of the gate into its open position. When in this open position, the gate projects forwardly of the basket and is normally permitted to rest on the top of the checkout counter. In other instances it is not permissible to rest the gate on the end of the checkout counter, such as those installations where the end of the checkout counter is occupied by a scale. It is then necessary to swing the gate downwardly whereby it is freely suspended downwardly below the basket. While gates of this type do operate satisfactorily with respect to their manual manipulation between open and closed positions, nevertheless the position of the gate when in its open position has created various disadvantages associated with unloading of the cart.

For example, when the end of the checkout counter is equipped with specialized equipment, such as a scale, the gate can not be pivoted downwardly onto the scale since this interferes with the operation thereof. The gate must thus be swung outwardly and then downwardly so as to be suspended below the basket. This is undesirable for several reasons, the first of which is that the gate must be swung into its open position while the front end of the basket or cart is spaced rearwardly a substantial distance from the end of the checkout counter. Sine opening of the gate is normally the function of the checkout clerk, it is often difficult for the clerk to reach the required distance to effect an efficient and convenient opening of the gate. Further, after the gate has been opened and the basket unloaded, it is also difficult for the clerk to reach downwardly and swing the gate upwardly into its closed position.

In other instances, the gate is swung downwardly and positioned on the free edge of the counter so as to not interfere with specialized equipment located adjacent the end of the counter. When unloading the basket, it is thus more difficult for the clerk to reach the rear of the basket so as to remove the goods therefrom. Further, any slight rearward movement of the basket results in the gate dropping off the counter, which can be damaging if any goods are resting on or being slidably moved across the gate.

The disadvantages associated with resting the gate on the counter are further compounded by the recent adoption of automatic cash registers for recording the cost of the goods. With these systems, the checkout counter is normally provided with a price scanning window located directly adjacent the inlet end of the counter, which window has a suitable light beam located thereunder. The checkout operators removes the goods from the basket and then slowly slidably moves same across the window so that the bar code on the goods, which is indicative of the price, is thus scanned and, through an intermediate computer, is automatically recorded in the cash register. It is thus essential that the scanning window remain unobstructed. Since many of the present checkout counters, when utilized with a swingable gate of the above-described type, result in the opened gate overlapping the scanning window, this thus prevents proper operation of the automatic price recording system. In these instances, the cart must be backed away from the counter so that the gate does not overlap the scanning window and, when this is done, the problems set forth above are then experienced.

Accordingly, it is an object of this invention to provide an improved gate construction for a shopping cart which overcomes the disadvantages mentioned above. More specifically, the objects of this invention include the provision of:

1. An improved gate construction for a shopping cart basket which can be easily and efficiently swingably opened and then moved into a storage position wherein the gate is disposed parallel with, but below the bottom of the basket.

2. A gate construction, as aforesaid, in which the gate is initially swingably moved outwardly and downwardly away from its closed position into a substantially horizontal position, and can then be slidably moved horizontally rearwardly of the basket into a storage position wherein the gate is located beneath the bottom of the basket adjacent the front end thereof.

3. A gate construction, as aforesaid, which permits the front end of the basket to be positioned directly adjacent or in overlapping relationship with respect to the end of the checkout counter to facilitate the unloading of the goods onto the counter, thereby enabling the checkout clerk to more easily reach the goods located in the rear of the basket, and at the same time permitting storage of the gate under the bottom wall of the basket to prevent it from interfering with any equipment located on the end of the checkout counter, such as a scale, a price scanning window, or the like.

4. A gate construction, as aforesaid, which when in the stored position beneath the bottom wall of the basket can be easily pulled outwardly therefrom and then swung upwardly to permit reclosing of the gate.

5. A gate construction, as aforesaid, which in addition to being storable in a position disposed substantially fully under the basket bottom wall, can also be partially moved backwardly under the basket bottom wall into a partially stored condition while still permitting pivotal movement of the gate so that it can be swung downwardly onto a counter or the like in those instances where such operation is desired.

6. A gate construction, as aforesaid, particularly adapted for integration with a shopping cart basket of rod and wire mesh construction and which can be provided on a shopping cart without requiring any major redesign or reconstruction of the cart.

Other objects and purposes of this invention will be apparent to persons acquainted with apparatus of this general type upon reading the following specification and inspecting the accompanying drawings.

Certain terminology will be used in the following description for convenience in reference only and will not be limiting. For example, the words "up", "down", "right", and "left" will designate directions in the drawings to which reference is made. The words "front" and "rear" will refer to the ends of the cart and the basket which lie respectively to the right and to the left in FIG. 1. The words "in" and "out" will refer to directions toward and away from, respectively, the geometric center of the cart and designated parts thereof. Said terminology will include derivatives of the above words, and words of similar import.

SUMMARY OF THE INVENTION

The objects and purposes of this invention are met by providing a gate construction for a shopping cart basket, wherein a gate panel is disposed between sidewalls of the basket for closing an end thereof. The gate panel has its lower edge pivotally supported on a pair of brackets which, in the illustrated embodiment, are mounted to the sidewalls adjacent the lower corners thereof. A latch structure co-acts between the sidewalls and the upper corners of the gate for holding the gate in a closed position. The pivotal mounting of the gate on the brackets permits the gate panel to be lifted upwardly to release the latch structure. The gate panel can then be swung outwardly and downwardly away from the basket into an intermediate open position. The support brackets are provided with substantially L-shaped slots in which the lower edge of the gate panel is pivotally and slidably supported. These slots have elongated horizontal portions disposed below and extending rearwardly along the bottom wall of the basket. When the gate is swung into the intermediate open position, the gate can then be pushed rearwardly so that it is slidably retracted beneath the bottom wall of the basket, as permitted by the above-mentioned horizontal slots. Suitable support flanges are provided on the bracket and project outwardly below the slots to support the gate when it is retracted below the bottom wall of the basket. The slots permit the gate to be moved beneath the bottom wall to a sufficient extent that the free edge of the gate is disposed closely adjacent the free edge of the bottom wall.

DETAILED DESCRIPTION

Figure 1:
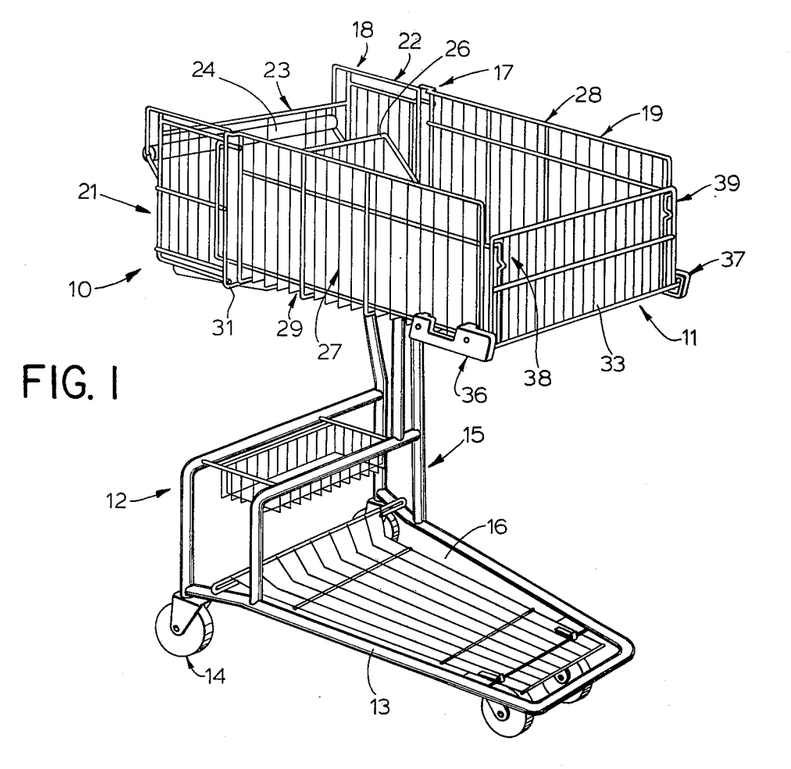
FIG. 1 is a perspective view of a known shopping cart incorporating therein the improved gate construction of this invention.

FIG. 1 discloses a shopping cart 10 having a gate construction generally indicated at 11 embodying the invention. Although the gate construction embodying the invention may be used with a variety of shopping carts, it is particularly intended for and is advantageously usable with a cart 10 which is generally of the type shown. The cart 10 includes a framework 12 preferably constructed of metal tubing and including a forwardly tapering lower base member 13 which is supported by casters 14 at its forward and rearward ends. A pair of upstanding tubes 15 are fixed on at least one side of the base member 13, adjacent its rear end, for supporting at their upper ends a substantially horizontal upper frame member (not shown). Such upper frame member is preferably similar in configuration to the lower base member 13 and overlies same, but does not extend as far forwardly thereas. A shelf 16 preferably of rod and wire mesh may be provided on the lower base member for carrying goods. The shelf 16 is preferably pivotable about a transverse axis adjacent its forward end, the rearward end of said shelf rising to allow nesting of another and similar cart from behind the cart 10.

A substantially rectangular, upwardly opening receptacle or basket 17 is supported on the framework 12, more particularly on said upper base member, and comprises a fixed rear portion 18 and a pivotable front portion 19. The basket 17 may be of any convenient construction, but in the preferred embodiment shown is of rod and wire mesh construction. The fixed rear portion comprises sidewalls 21 and 22, an upstanding rear wall 23 and a bottom wall (not shown). A handle 24 is spaced rearwardly from the rear wall 23 and fixed to the rear basket portion 18 for enabling a user to move the cart 10 from place to place. If desired, the fixed basket portion 18 may be fitted with an infant seat including a movable back rest 26.

The pivotable front basket portion 19 includes sidewalls 27 and 28, a bottom wall generally indicated at 29 and a forward end wall, here defined by the gate construction 11. The sidewalls 27 and 28 are preferably spaced to receive the sidewalls 21 and 22 of the rear basket portion 18 therebetween when the front basket portion 19 is pivoted upwardly as next described. A perimeter rod member 31 defines the rearward edge of the bottom wall 29 of the front basket portion 19. The perimeter rod member 31 is pivotally supported by means not shown on the framework 12 to enable the front basket portion 19 to pivot upwardly and rearwardly thereabout so that the bottom wall 29 thereof is upstanding and the sidewalls 27 and 28 thereof fit outside the sidewalls 21 and 22 of the rear basket portion 18. Such an upward pivoting of the front basket portion 19 out of its position of use shown in FIG. 1 allows nesting of the cart 10 behind a further and similar cart.

The cart 10 to the extent above-described is generally similar to the carts disclosed in the aforementioned U.S. Pat. Nos. 3,245,498 and 3,503,622.

The gate construction 11 includes a substantially planar gate panel 33, preferably of rod and wire mesh construction. The gate panel 33 is located adjacent its bottom edge on the basket 17 by bracket units 36 and 37. The bracket units are located at the forward edge of the basket at the junction of the bottom wall 29 with the respective sidewalls 27 and 28. Integral latch units, generally indicated at 38 and 39, support the gate panel 33 in its closed position (as shown in FIG. 1).

Figure 2:
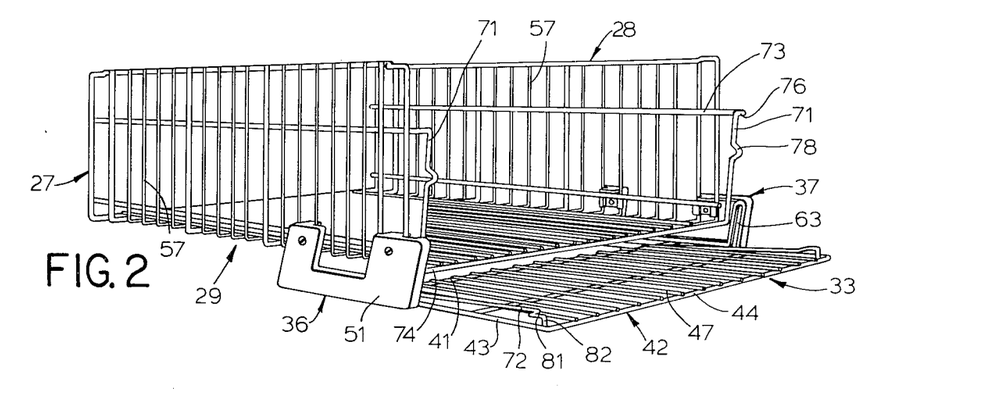
FIG. 2 is an enlarged perspective view of the front portion of the basket and illustrating the gate in an opened and partially stored condition.

The gate panel 33 comprises a bottom or pivot bar 41 (FIGS. 2 and 5) which extends transversely between and engages, in a manner hereinafter described, the bracket units 36 and 37. A frame bar 42 is substantially of an inverted U-shape and has spaced, substantially upstanding side bars 43 fixed, as by welding, to the pivot bar 41 adjacent opposite ends thereof. The upper ends of the side bars 43 are connected by a preferably integral bight bar 44 which forms the upper edge of the gate panel. An intermediate bar 46 extends laterally between side bars 43 and is fixed thereto, as by welding. A plurality of transversely spaced, upstanding wires 47 are distributed across the width of the gate panel 33 and are fixed preferably to the interior faces of the bars 41, 42 and 46, as by welding.

The bracket units 36 and 37 (FIG. 1), in the illustrated embodiment, are identical except for being mirror images of each other. Each bracket unit includes a U-shaped bumper 51 which is preferably molded of rigid plastic material. The bumper includes vertical leg portions 52 and 53 joined by the bight portion 54 which, as shown in FIG. 5, is positioned below the bottom wall of the basket.

The bumper 51 is, in the illustrated embodiment, secured to its respective sidewall 27 or 28. The bracket unit thus includes a pair of securing clips 56 which have a raised or projecting center portion which is adapted to be positioned between a pair of parallel side rods 57 formed on the respective sidewall of the basket, with the ends of each clip being offset so as to overlap the adjacent pair of parallel side rods 57. Each clip is fixedly connected to one of the leg portions 52 or 53 of the bumper by means of a rivet or screw 58 which extends therebetween, whereby the side rods 57 are clamped between the bumper and the clips so that the entire bracket unit is fixedly secured to the basket sidewall.

Figure 3:
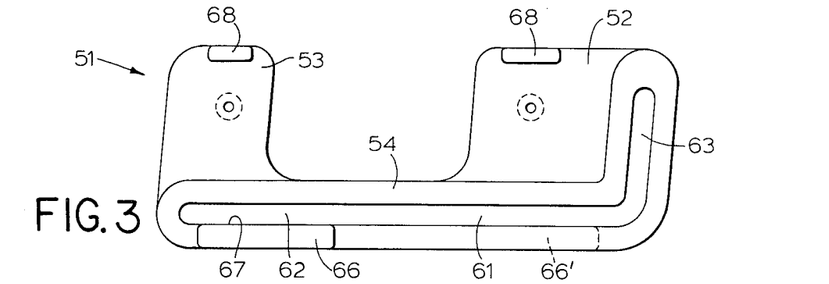
FIG. 3 is an enlarged side elevational view of the bumper utilized for pivotally and slidably supporting the gate.
Figure 5:
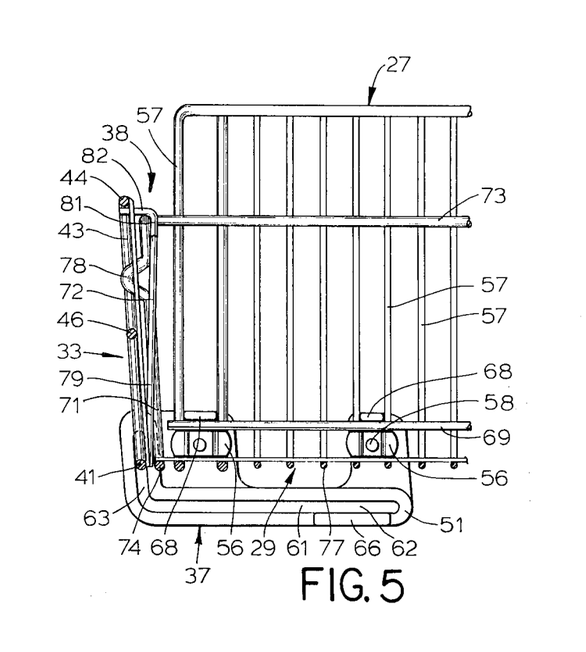
FIG. 5 is a sectional view taken substantially on the line V—V in FIG. 4 and showing the gate in its closed position.

As shown in FIGS. 3 and 5, the bumper 51 has a guide track formed as an L-shaped slot 61 in which is slidably received the projecting end of the pivot bar 41 formed on the bottom of the gate panel 33. This slot 61 includes a substantially horizontally elongated slot portion 62 which extends along the bight portion 54 and is disposed at an elevation below the bottom wall 29 of the basket. The slot 61 also includes an upright slot portion 63 which extends substantially vertically and projects upwardly along the front leg portion 52, with the slot portion 63 being located forwardly of the front edge of the bottom wall 29. These slot portions 62 and 63 are joined together and the transition therebetween is of a smooth and curved configuration.

Positioned directly below the horizontal slot portion 62 is a supporting flange 66 which is formed integrally on the bumper 51. This flange 66 may extend throughout a length closely corresponding to the length of the horizontal slot portion 62, although it preferably extends forwardly from the rearward end of slot portion 62 through a maximum distance equal to approximately one-third to one-half the length of slot portion 62 for a purpose explained hereinafter. Flange 66 is disposed directly beneath this slot portion so that it thus defines an upwardly directing supporting surface 67. The flange 66 projects, in the illustrated embodiment, inwardly from the bumper and is positioned directly below and spaced downwardly from the bottom wall 29.

The bumper 51 also has a pair of mounting flanges 68 associated therewith, one of the flanges 68 projecting inwardly from each of the leg portions 52 and 53 adjacent the upper end thereof. These flanges are adapted to project inwardly between a pair of adjacent side rods 57 on the basket, and are positioned so that they are slightly above the securing clips 56 whereby these flanges 68 overlap the longitudinally extending reinforcing rod 69 which is secured to the inner surface of the basket sidewall and extends longitudinally therealong at an elevation slightly above the bottom wall 29.

Figure 4:
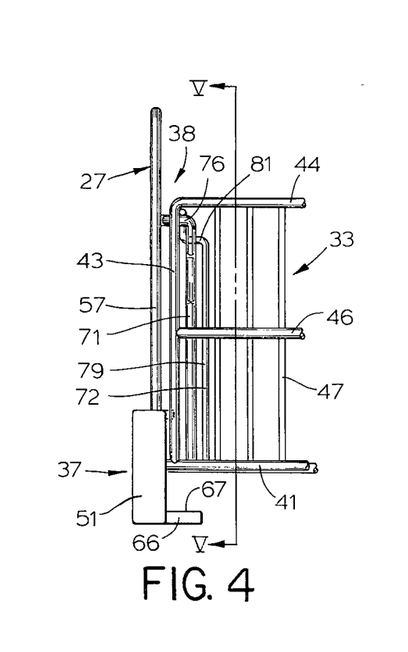
FIG. 4 is an enlarged, fragmentary front elevational view of the basket and showing the gate in its closed latched position.

Considering now the latch units 38 and 39, they are preferably mirror images of one another so that only unit 38 will be described. The latch unit includes (FIGS. 2, 4 and 5) a basket mounted member 71 arranged for latching coaction with a gate mounted member 72. The basket mounted, or fixed, latch member 71 comprises a substantially upstanding bar or rod preferably forwardly inclined at its upper end, such as about a 4° angle with respect to the vertical. The gate panel 33, when in its closed position of FIG. 5, is thus preferably somewhat forwardly sloped substantially in parallelism with the fixed latch member 71. This fixed latch member 71 is spaced inboard of the respective basket sidewall 27 and is spaced closely inboard of the adjacent side bar 43 of the gate panel 33 when the latter is in its closed position (FIG. 4).

In the preferred embodiment shown, the fixed latch member 71 is an integral continuation of, and is substantially at right angles to, a pair of rods 73 and 74 (FIG. 5) integrated in the basket sidewall 27 and bottom wall 29, respectively. More particularly, rod 73 runs substantially the length of the sidewall on the interior side thereof and is located in the upper half of such sidewall in downwardly spaced relationship to the top edge thereof. This rod thus acts as a reinforcing element for the sidewall. The rod 73 extends forwardly past the frontmost rod 57 and is connected to the fixed latch member 71 through a short horizontal segment 76 which preferably extends at right angles to both the latch member 71 and the rod 73. The bottom end of the fixed latch member 71 is preferably integrally connected to the rod 74, with the top edge of the rod 74 preferably being coplanar with the top edges of rods 77 which define the bottom wall 29 of the basket.

The fixed latch member 71 is deformed to provide a generally V-shaped forwardly extending ear 78 adjacent, but spaced downwardly from, the upper end thereof. This ear 78 extends forwardly sufficiently to overlap the adjacent side bar 43 of the gate panel 33 when the latter is in its closed position of FIGS. 4 and 5. In such position, the ear 78 is located above the intermediate bar 46 so as to allow a limited amount of upward travel of the gate panel 33 to the limit established by interference between the pivot bar 41 and the upper end of the upright slot portion 63.

The gate-mounted or movable latch member 72 includes an elongated, preferably linear and rodlike lower segment 79. This segment 79 is fixed, as by welding, to the normally rearward face of the gate pivot bar 41 and extends upwardly as seen in FIG. 5 along the interior face of the gate and at a shallow angle, here about 5°, thereto. In the closed condition of the gate shown in FIG. 5, the segment 79 is substantially vertically or slightly inclined at its upper end interiorly of the basket. When seen from the front as in FIG. 4, the segment 79 parallels the sidewall 27 and is spaced interiorly from the gate side bar 43 and from the fixed latch member 71. The segment 79 extends slightly above the ear 78 but does not reach the height of the top of the fixed latch member 71.

This movable latch member 72 further includes a substantially L-shaped segment 81 connected to the lower segment 79 at the upper end thereof and extending exteriorly and then upwardly therefrom, with the L-shaped segment 81 lying in the same transverse plane as the lower segment 79. This L-shaped segment 81, in the closed position of the gate, lies rearwardly of, and in overlapping contact with the fixed latch member 71 and its connected horizontal segment 76.

The movable latch member 72 still further includes a support segment 82 which extends forwardly from the upper end of the L-shaped segment 81 and is fixed, preferably by welding, to the inboard face of the gate panel side bar 43. The support segment 82, in the closed position of the gate shown in FIGS. 4 and 5, rests atop the fixed horizontal rod segment 76 of the fixed latch member 71 for supporting the closed gate. In such position, the pivot rod 41 which defines the lower edge of the gate is substantially coplanar with the basket bottom wall rods 77 and is spaced intermediate the ends of the upward slot portion 63. The spacing of the L-shaped segment 81 from the rearwardly facing surface of the gate panel 33 exceeds the thickness of the fixed latch member 71 and its horizontal segment 76 to enable the gate to be raised sufficiently that the L-shaped segment 81 of the movable latch member 72 lies above and hence clears the top of the fixed latch member 71, whereat the pivot bar 41 of the gate panel lies approximately at the top of the upright slot portion 63 formed in the bumper 51, whereby the gate panel 33 can then be freely pivoted forwardly (counterclockwise in FIG. 5) about the axis of the pivot bar 41.

The structure and operation of the latch units 38 and 39 is illustrated and described in greater detail in above-mentioned U.S. Pat. No. 3,815,932.

OPERATION

During normal utilization of the cart 10, the gate panel 33 is maintained in its closed position as illustrated in FIGS. 1, 4 and 5.

When it is desired to move the gate panel 33 into its open position so as to facilitate the removal of goods from the basket, then the gate is manually lifted upwardly from the closed position of FIGS. 4 and 5 until the L-shaped segments 81 on the gate mounted latching members 72 clear the upper ends of the basket mounted latch members 71. When this raised position is achieved, then the gate panel 33 is manually pivoted outwardly and downwardly (counterclockwise in FIG. 5) until the gate panel approaches a substantially horizontal position. During this swinging of the gate panel, the weight of the gate permits the lower pivot rod 41 to slide downwardly along the vertical slot portion 63 so as to enter into the curved transition portion located at the junction of the vertical and horizontal slot portions 63 and 62, respectively. As the gate panel 33 reaches or closely approaches a horizontal position, the gate panel 23 is then manually pushed rearwardly of the basket which causes the lower pivot bar 41 to slide rearwardly (rightwardly in FIGS. 5 and 6) along the horizontal slot portion 62 until it abuts the rearward ends of the slot portions 62. The gate panel 33 is thus disposed substantially totally under the bottom wall 29 of the basket in substantially parallel relationship therewith. The gate can then be manually released, whereupon the gate will be supported by the flanges 66.

Figure 6:
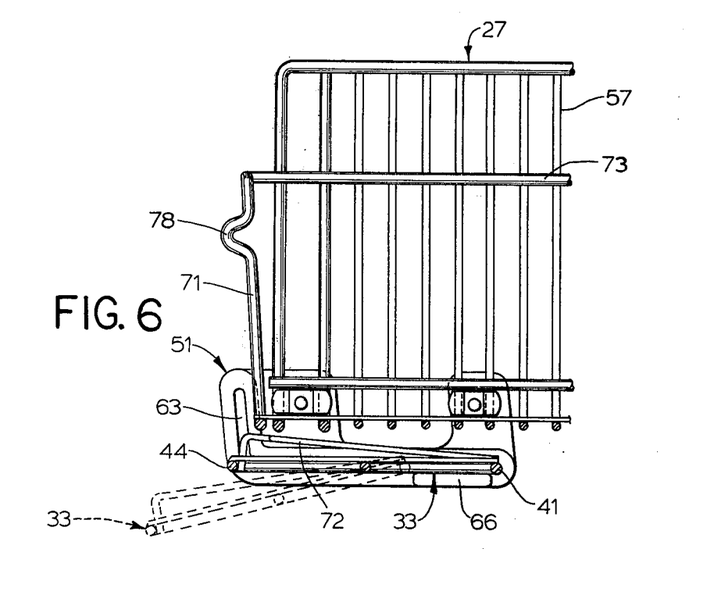
FIG. 6 is a view similar to FIG. 5 but showing the gate in its fully opened and fully retracted position beneath the bottom of the basket.

As illustrated in FIG. 6, the gate is preferably disposed in its retracted position so that the top bar 44 on the gate panel is spaced slightly outwardly from the forward edge of the bottom wall 29 so as to permit more convenient access to the gate when same is to be returned to its closed position. This also prevents the clerk from pinching his fingers between the gate and the bottom wall during movement of the gate into the retracted position. This desired positioning of the gate in its retracted position is achieved by selecting suitable dimensions for the gate and the horizontal slot portion.

Since the support flanges 66 are preferably provided solely adjacent the rearward ends of the slot portions 62, the gate can also be positioned in a partially stored yet hingedly related position (shown by dotted lines in FIG. 6) if desired. That is, the gate can be swingably moved downwardly past the horizontal position and, simultaneously therewith, the hinge axis of the gate as defined by the pivot rod 41 can be slidably moved rearwardly along the slot portions 62, thereby enabling the gate to be pivotally dropped downwardly onto the counter (as indicated by dotted lines in FIG. 6) while at the same time enabling the gate to be partially stored beneath the bottom wall of the basket. This facilitates storing and handling of the gate by permitting free pivoting movement thereof, even when the gate is partially moved backwardly beneath the bottom wall of the basket, and thereby increases the flexibility and adaptibility of the gate to any desired condition of use inasmuch as the hinge axis defined by the pivot bar 41 can be slidably retracted rearwardy part way along the length of the slot portions 62 while still permitting free downward pivoting movement of the gate.

A further advantageous feature which results from the flanges 66 terminating at a distance substantially rearwardly from the forward ends of the slot portions 62 is that the gate can thus be located in its stored horizontal position beneath the basket bottom wall only when the gate is substantially fully retracted beneath the bottom wall. This prevents the gate from being located in its horizontal stored position while effectively projecting outwardly substantially beyond the front of the basket, in which condition the check-out clerk could accidentally apply an undesirably large and hence damaging downward force on the cantilevered gate.

Thus, the structure of the present invention is highly desirable since not only does it permit swinging movement of the gate from a closed position into an open position, but it also enables the gate to be moved into a retracted or stored open position wherein the gate is disposed substantially entirely below the bottom wall of the basket. This thus enables the opened basket to be positioned directly adjacent the edge of the checkout counter without the gate interfering with the counter or any equipment associated therewith. The gate can also be moved into this open storage position even when the cart is located directly adjacent or even overlapping the end of the checkout counter. This thus enables the basket to be positioned as closely as possible to the checkout counter, and to the checkout clerk, to permit the clerk to more readily reach into the rearward part of the basket to remove the goods therefrom.

In addition, the open storage position which is achieved by utilizing the improved gate structure of the present invention is accomplished by utilizing an extremely simple and durable structure formed primarily by the bumper 51. This member, in addition to functioning as an external bumper for the basket, also performs many additional functions relative to the movement of the gate, the first being that it permits lifting of the gate out of the latch structure, the second being the pivoting of the gate outwardly and downwardly away from its closed position, the third being the permissible slidable movement of the gate into a retracted position beneath the bottom wall, the fourth being limiting the retraction of the gate beneath the bottom wall, and the fifth being the supporting of the gate in its stored retracted position so that it cannot swing downwardly into a suspended position, whereby the gate is readily accessible when it is to be returned to its closed position.

While the guide structure which permits hinging and sliding movement of the gate is disclosed as being integral with the bumpers, and while this structure arrangement is highly desirable in view of the simplicity thereof, it will be appreciated that the guide structure for the gate can be separate from the bumpers if desired. Further, this guide structure can be mounted directly on the bottom wall of the basket if desired. In addition, while the horizontal slot portion 62 as illustrated is positioned below the bottom wall of the basket, it will be appreciated that the gate can be provided with wrap-around portions located on the opposite edges thereof, which wrap-around portions can be slidably confined within guides provided on the sidewalls adjacent the lower edges thereof but at an elevation above the bottom wall of the basket.

The illustrated embodiment of this invention also discloses the gate being mounted on a cart of the type normally referred to as an over-the-counter cart, in which cart the basket swings upwardly into an upright position to permit nesting of like carts. However, the improved gate structure of this invention is also applicable to many other cart structures, such as a conventional cart of the type employing a large stationarily mounted basket wherein the nesting of like carts occurs due to the baskets nesting one within the other.

While the embodiment illustrated in the accompanying drawings discloses the gate support flange 66 extending over only a part of the length of the accompanying slot, it will be appreciated that this flange 66 can extend over substantially the full length of the slot, if desired. This not only provides additional strength for the flange, but this also prevents the gate from being swung downwardly when in a partially stored condition, since in some operations this type of movement may be undesirable. The use of a substantially full length supporting flange has been illustrated by dotted lines in FIG. 3, which full length flange is indicated by the numeral 66'. Rather than making this flange 66 continuous throughout its length, the flange 66 could be of relatively short length and positioned adjacent only the forward end of the respective slot 61, since this would still permit the gate to be supported in the desired horizontal storage position located beneath the bottom wall of the basket.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. In a shopping cart having an upwardly opening basket including spaced sidewalls upstanding from a bottom wall, the basket having an opening in one end thereof, and a gate movably supported on the basket for closing the opening, the improvement comprising:
   mounting means coacting between the gate and the basket for permitting movement of said gate between a first position wherein the gate projects upwardly from the bottom wall and closes said opening and a second position wherein the gate is disposed in an opened position located below and approximately parallel with said bottom wall;
   said mounting means including first means for permitting said gate to be swingably moved from said first position into an intermediate position wherein the gate extends at least partially outwardly away from the basket in a direction which is approximately parallel with the bottom wall, and second means for permitting the gate to be substantially slidably displaced as a unit from said intermediate position into said second position wherein at least a majority of the gate is disposed beneath the bottom wall.

2. A shopping cart according to claim 1, including support means fixed to said basket and engageable with said gate when the latter is in said second position for preventing said gate from swinging downwardly away from said bottom wall.

3. A shopping cart according to claim 1, wherein said mounting means includes a pair of brackets mounted on the opposite sidewalls adjacent said open end, said brackets having said first and second means associated therewith, said brackets also having support flange means positioned downwardly below said bottom wall and defining a space therebetween in which is disposed said gate when in said second position, said support flange means being disposed below said gate for preventing same from swinging downwardly when in said second position.

4. A shopping cart according to claim 1, wherein said mounting means includes brackets mounted adjacent the opposite sides of said basket adjacent said open end, said brackets having said first and second means associated therewith, and said mounting means also including stop means coacting between said basket and said gate for preventing said gate from swinging downwardly when in said second position.

5. A shopping cart according to claim 4, wherein each said bracket has an L-shaped guide track which includes an upwardly extending track portion which defines said first means, said L-shaped track also having an elongated substantially horizontally extending track portion which defines said second means and which is connected to the lower end of said upwardly extending track portion and projects rearwardly of said basket through a substantial distance away from said opening.

6. A shopping cart according to claim 5, wherein said gate has a pivot member located adjacent the lower end thereof with said pivot member being pivotally and slidably supported on the L-shaped tracks, and a pair of releasable latch structures cooperating between the upper portion of said gate and the respective edges of said sidewalls for releasably maintaining the gate in said first position, the pivot member being engaged with said upwardly extending track portion when the gate is in said first position.

7. A shopping cart according to claim 6, wherein said horizontal track portion is spaced downwardly below said bottom wall, and wherein said bracket has support flange means positioned below said horizontal track portion and disposed below said gate for preventing same from swinging downwardly when said gate is in said second position.

8. A shopping cart according to claim 7, wherein said L-shaped guide track comprises a slot.

9. In a shopping cart having an upwardly opening basket including spaced sidewalls upstanding from a bottom wall, the basket having an opening in one end thereof, and a gate movably supported on the basket for closing the opening, the improvement comprising:
mounting means coacting between the gate and the basket for permitting movement of said gate between a first position wherein the gate projects upwardly from the bottom wall and closes said opening and a second position wherein the gate is disposed in an opened position located below and approximately parallel with said bottom wall;
said mounting means including first means for permitting said gate to be swingably moved away from said first position about a substantially horizontal pivot axis located adjacent the lower edge of said gate, second means for permitting said gate to be moved into an intermediate storage position wherein the lower edge of the gate is disposed below the bottom wall of the basket and spaced rearwardly from the front edge of said bottom wall while still permitting the gate to be swingably moved with respect to the basket about said horizontal pivot axis, and third means for permitting the gate to be substantially linearly slidably displaced into said second position wherein the gate is disposed substantially totally beneath the bottom wall of said basket so that the upper edge of said gate is positioned closely adjacent the front edge of said bottom wall.

10. in a shopping cart having an upwardly opening basket including spaced sidewalls upstanding from a bottom wall, the basket having an opening in one end thereof, and a gate movably supported on the basket for closing the opening, the improvement comprising:
mounting means coacting between the gate and the basket for permitting movement of said gate between a first position wherein the gate projects upwardly from the bottom wall and closes said opening and a second position wherein the gate is disposed in an opened position in which at least a majority of the gate is located beneath and approximately parallel with said bottom wall, said mounting means including a pair of bumpers mounted adjacent the lower front corners of said basket, said bumpers having guide means thereon for slidably supporting said gate for movement into said opened position, said guide means including an elongated guide portion which extends substantially parallel to the bottom wall of said basket.

11. In a shopping cart having a frame structure which includes a roller-supported base and a pedestal fixed to said base and projecting upwardly therefrom and supporting thereon an upwardly opening basket structure, said basket structure including a bottom wall which extends between and has the opposite edges thereof fixed to a pair of upstanding sidewalls which are joined together at one end of the basket structure by an end wall, the other end of said basket structure being open, a handle structure associated with the cart adjacent said end wall, and a movable gate construction associated with the open end of said basket structure for closing same, said gate construction including a movable panel-like gate structure for closing the open end of said basket structure, the improvement comprising:
mounting means connected between said gate structure and said basket structure for movably supporting said gate structure for movement between a closed position wherein the gate structure projects upwardly above said bottom wall for closing said open end and an opened stored position wherein the gate structure is disposed below said bottom wall in substantially parallel relationship therewith and is positioned so that at least a majority of said gate structure is positioned directly beneath and superimposed by said bottom wall;
releasable latch means cooperating between said basket structure and said gate structure for releasably holding said gate structure in said closed position; and
support means mounted on one of said basket and gate structures and coacting with the other of said basket and gate structures when the gate structure is in said opened stored position for holding said gate structure in a position wherein it is approximately parallel with said bottom wall.

12. A cart according to claim 11, wherein said mounting means includes bracket means fixed to said basket structure and slide means cooperating between said gate structure and said bracket means for permitting relative slidable displacement of said structure with respect to said basket structure.

13. A cart according to claim 12, wherein said slide means includes elongated guide track means fixedly associated with said bracket means, and said gate structure having a slide element slidably coacting with said guide track means, the cooperation of said guide track means and said slide element also permitting said gate structure to be pivotally displaced about a substantially horizontal pivot axis as said gate structure is being moved between said opened and closed positions.

14. A cart structure according to claim 13, wherein said slide element is located adjacent the lower edge of said gate structure, wherein said support means is fixedly associated with said bracket means and includes horizontally extending projection means spaced downwardly from said bottom wall to define a vertical clearance space therebetween in which a part of said gate structure is accommodated when the gate structure is in said opened position, whereby said gate structure bears against said projection means.

15. A cart according to claim 13, wherein said bracket means includes a pair of bracket units which are fixedly mounted on the sidewalls at the lower corners thereof adjacent said open end, said bracket units projecting outwardly and downwardly beyond the respective sidewalls and being mirror images of one another.

16. A cart according to claim 13, wherein the support means maintains said gate structure in a position approximately parallel with said bottom wall only when the gate structure is in said opened stored position wherein the gate structure is disposed substantially entirely below said bottom wall so that the upper free edge of said gate structure is disposed closely adjacent the end edge of said bottom wall as defined at the open end of said basket structure, and said guide track means and its cooperation with said slide element permitting the horizontal pivot axis of said gate structure to be linearly slidably displaced rearwardly beneath said bottom wall away from the end edge thereof while still permitting pivotal displacement of said gate structure relative to said basket structure, whereby said gate structure can be moved into an intermediate stored position wherein it is angularly related with respect to said bottom wall and is disposed partially thereunder.

17. A cart according to claim 13, wherein said mounting means permits the gate structure when being moved between said closed and opened positions to assume an intermediate position wherein the gate structure is disposed substantially horizontally and has the lower edge thereof positioned adjacent the one end of the bottom wall of the basket structure so that the gate structure thus projects outwardly away therefrom, and said support means cooperating with said gate structure for maintaining same in a substantially horizontal position when the gate structure is movably displaced between said intermediate and opened positions.

18. In a shopping cart including an upwardly opening rectangular basket having three sides thereof defined by side walls which are upstanding from a bottom wall, the basket having a fourth side thereof defined by an opening, and a gate structure movably supported on the basket for closing the opening, the improvement comprising:

mounting means coacting between the gate and the basket for permitting movement of said gate between a first position wherein the gate projects upwardly from the bottom wall and closes said opening and a second position wherein at least a majority of the gate is located exteriorly of and approximately parallel with an adjacent one of said walls in superimposed relationship therewith so that the opening is opened;

said mounting means including first means for permitting said gate to be swingably moved from said first position into an intermediate position wherein the gate extends at least partially outwardly away from the basket, and second means for permitting the gate to be substantially linearly slidably displaced from said intermediate position into said second position.

19. In a shopping cart having an upwardly opening basket including spaced side walls upstanding from a bottom wall, the basket having an opening in one end thereof, and a gate movably supported on the basket for closing the opening, the improvement comprising:

mounting means coacting between the gate and the basket for permitting both angular and translatory movement of said gate relative to said basket between a first position wherein the gate projects upwardly from the bottom wall and closes said opening and a second position wherein the gate is located below and approximately parallel with said bottom wall so that at least a majority of said gate is disposed beneath said bottom wall, said gate being defined between upper and lower substantially horizontally extending edges when said gate is in said first position, said gate when in said second position having said lower edge disposed beneath said bottom wall and spaced rearwardly a substantial distance from the end edge of said bottom wall as defined at said opening, said gate when in said second position having the upper edge thereof positioned in the vicinity of the end edge of said bottom wall; and support means coacting between said basket and said gate when the gate is in said second position for preventing said gate from swinging downwardly away from said bottom wall.

* * * * *

UNITED STATES PATENT AND TRADEMARK OFFICE
CERTIFICATE OF CORRECTION

PATENT NO. : 4 118 044
DATED : October 3, 1978
INVENTOR(S) : Harry Celms

It is certified that error appears in the above-identified patent and that said Letters Patent are hereby corrected as shown below:

Column 11, Line 51; change "in" to ---In---.

Column 12, Line 44; after "said" insert ---gate---.

Signed and Sealed this

Nineteenth Day of December 1978

[SEAL]

Attest:

RUTH C. MASON
Attesting Officer

DONALD W. BANNER
Commissioner of Patents and Trademarks

Dedication 4,118,044.—*Harry Celms*, Battle Creek, Mich. GATE MECHANISM FOR CART. Patent dated Oct. 3, 1978. Dedication filed Aug. 18, 1980, by the assignee, *Roblin Industries, Inc.*

Hereby dedicates to the Public the entire term of said patent.

[*Official Gazette October 28, 1980.*]